UNITED STATES PATENT OFFICE.

SIE STAPLEFORD AND JAMES F. WAGNER, OF ABERDEEN, WASHINGTON, ASSIGNORS OF ONE-THIRD TO RICHARD H. ROBINSON AND NEWTON W. BUSH.

MANUFACTURE OF STEEL.

No. 902,010.　　　　Specification of Letters Patent.　　　　Patented Oct. 27, 1908.

Application filed January 9, 1908. Serial No. 409,968.

*To all whom it may concern:*

Be it known that we, SIE STAPLEFORD and JAMES F. WAGNER, citizens of the United States, residing at Aberdeen, in the county of Chehalis and State of Washington, have invented certain new and useful Improvements in the Manufacture of Steel, of which the following is a specification.

Our invention consists in the production, manufacture and use of the following formula for extracting, purifying and producing iron and steel, and especially the manufacture of a high grade of steel for use in the manufacture of fine instruments and tools, and we do hereby declare the following to be a full, clear and exact description of the same.

In the reduction of magnetic oxid of iron, or magnetic iron sand, we use the following formula to make a given quantity, viz; magnetic oxid of iron or sands, 100 pounds; pulverized charcoal (damp), 80 pounds; bicarbonate of soda, 12 pounds; pulverized borax, 8 pounds.

The above quantity of the different ingredients is to be thoroughly mixed into a thick paste with silicate of soda; this can be made into bricks with a briqueting machine, or can be made by hand if desired and must be dried in an oven, and then can be reduced in a common cupola or blast furnace, and can also be reduced in a crude oil furnace.

Though we have mentioned, in our composition, magnetic oxid of iron or sands, we are able by our process to extract steel also from the magnetic iron particles separated therefrom, or from metallic ore dust or any metallic residues.

We do not wish to be understood as confining ourselves to the quantities above mentioned, but to the proportions.

Having described our invention, what we claim as new and desire to secure by Letters Patent, is:

1. The process of extracting, purifying and producing iron and steel, which consists in using magnetic oxid of iron or sand, 100 pounds; pulverized charcoal, damp, 80 pounds; bicarbonate of soda 12 pounds; pulverized borax, 8 pounds, or the same ingredients in like proportions, the above ingredients being thoroughly mixed into a thick paste with silicate of soda, and made into bricks, dried in an oven and then reduced in a metallurgical furnace, substantially as described.

2. The process of making steel from magnetic oxid of iron or sands, which consists in mixing said magnetic oxid of iron or sands with damp pulverized charcoal, bicarbonate of soda and pulverized borax, into a thick paste with silicate of soda, drying in an oven, and then extracting therefrom the steel by the melting process in a crude oil furnace, substantially as described.

3. The process of winning metals from magnetic iron, sand, or from magnetic particles separated therefrom, or from metallic iron ore, dust or from any metallic residues, which consists in mixing the said materials with pulverized charcoal, bicarbonate of soda and pulverized borax, forming from the mass bricks, and extracting therefrom the materials by a furnace process, substantially as described and set forth.

In testimony whereof we affix our signatures in presence of two witnesses.

SIE STAPLEFORD.
　　　　　　　　JAMES F. WAGNER.

Witnesses:
　WILLIAM T. LE ROY,
　DANIEL GILLIES.